United States Patent
Maharshi et al.

(10) Patent No.: US 12,067,740 B2
(45) Date of Patent: Aug. 20, 2024

(54) METHODS AND APPARATUS FOR USING FILTERING TO IMPROVE IMAGE PATCH MATCHING AND/OR FOR USING DEPTH INFORMATION GENERATED FROM STEREO IMAGES

(71) Applicant: Deere & Company, Moline, IL (US)

(72) Inventors: Atul Maharshi, South Orange, NJ (US); Pablo A Anigstein, Palo Alto, CA (US); Rajiv Laroia, Far Hills, NJ (US)

(73) Assignee: Deere & Company, Moline, IL (US)

( * ) Notice: Subject to any disclaimer, the term of this patent is extended or adjusted under 35 U.S.C. 154(b) by 225 days.

(21) Appl. No.: 17/382,335

(22) Filed: Jul. 21, 2021

(65) Prior Publication Data

US 2022/0028101 A1    Jan. 27, 2022

Related U.S. Application Data

(60) Provisional application No. 63/055,167, filed on Jul. 22, 2020.

(51) Int. Cl.
*G06T 7/55* (2017.01)
*G06T 5/50* (2006.01)
(Continued)

(52) U.S. Cl.
CPC .................. *G06T 7/55* (2017.01); *G06T 5/50* (2013.01); *G06T 5/70* (2024.01); *G06T 5/73* (2024.01);
(Continued)

(58) Field of Classification Search
CPC .......... G06T 7/55; G06T 5/002; G06T 5/003; G06T 5/50; G06T 2207/20024; G06T 2207/20224; G06T 2207/10028
(Continued)

(56) References Cited

U.S. PATENT DOCUMENTS 9,571,819 B1    2/2017  Barron
9,672,635 B2 *  6/2017  Einecke .................. G06T 7/593
(Continued)

OTHER PUBLICATIONS

International Search Report and the Written Opinion of the International Searching Authority, International Search Report and Written Opinion of the International Searching Authority from PCT/US2021/42670 dated Oct. 22, 2021, 6 pages.

*Primary Examiner* — Ross Varndell
*Assistant Examiner* — Emmanuel Silva-Avina
(74) *Attorney, Agent, or Firm* — Straub & Straub; Michael P. Straub; Stephen T. Straub

(57) ABSTRACT

Methods and apparatus for processing images captured by cameras for use in stereo depth determinations are described and/or for using depth information generated by processing such images is described. Images are captured using a reference camera and at least one additional camera. Filtering is implemented as part of a patch matching process to reduce the risk of erroneous matches, e.g., due to image blur in one image but not another. The filtering may be, and sometimes is, implemented on a patch basis. A candidate patch is generated by filtering a portion of an image captured by a camera, e.g., a second camera by performing a sharpening or blurring operation to a portion of the image to generate a candidate patch. The amount of blurring or sharpening that is applied to generate the candidate patch depends, in some embodiments, on the relative difference between the candidate patch and the reference patch. Thus in some embodiments the amount of sharpening and blurring is dependent on both the content of the reference patch as well as the portion of the second image used to generate the candidate patch.

20 Claims, 8 Drawing Sheets

(51) Int. Cl.
*G06T 5/70* (2024.01)
*G06T 5/73* (2024.01)

(52) U.S. Cl.
CPC ............... *G06T 2207/20024* (2013.01); *G06T 2207/20224* (2013.01)

(58) Field of Classification Search
USPC ........................................................ 382/100
See application file for complete search history.

(56) References Cited

U.S. PATENT DOCUMENTS

| | | | |
|---|---|---|---|
| 2013/0089269 A1* | 4/2013 | Barnum | .................. G06T 5/003 |
| | | | 382/261 |
| 2015/0023587 A1 | 1/2015 | Barone | |
| 2015/0377607 A1 | 12/2015 | Einecke | |
| 2019/0020861 A1* | 1/2019 | Leonard | .................. G06T 7/593 |
| 2019/0333237 A1* | 10/2019 | Javidnia | .................. G06T 7/593 |

* cited by examiner

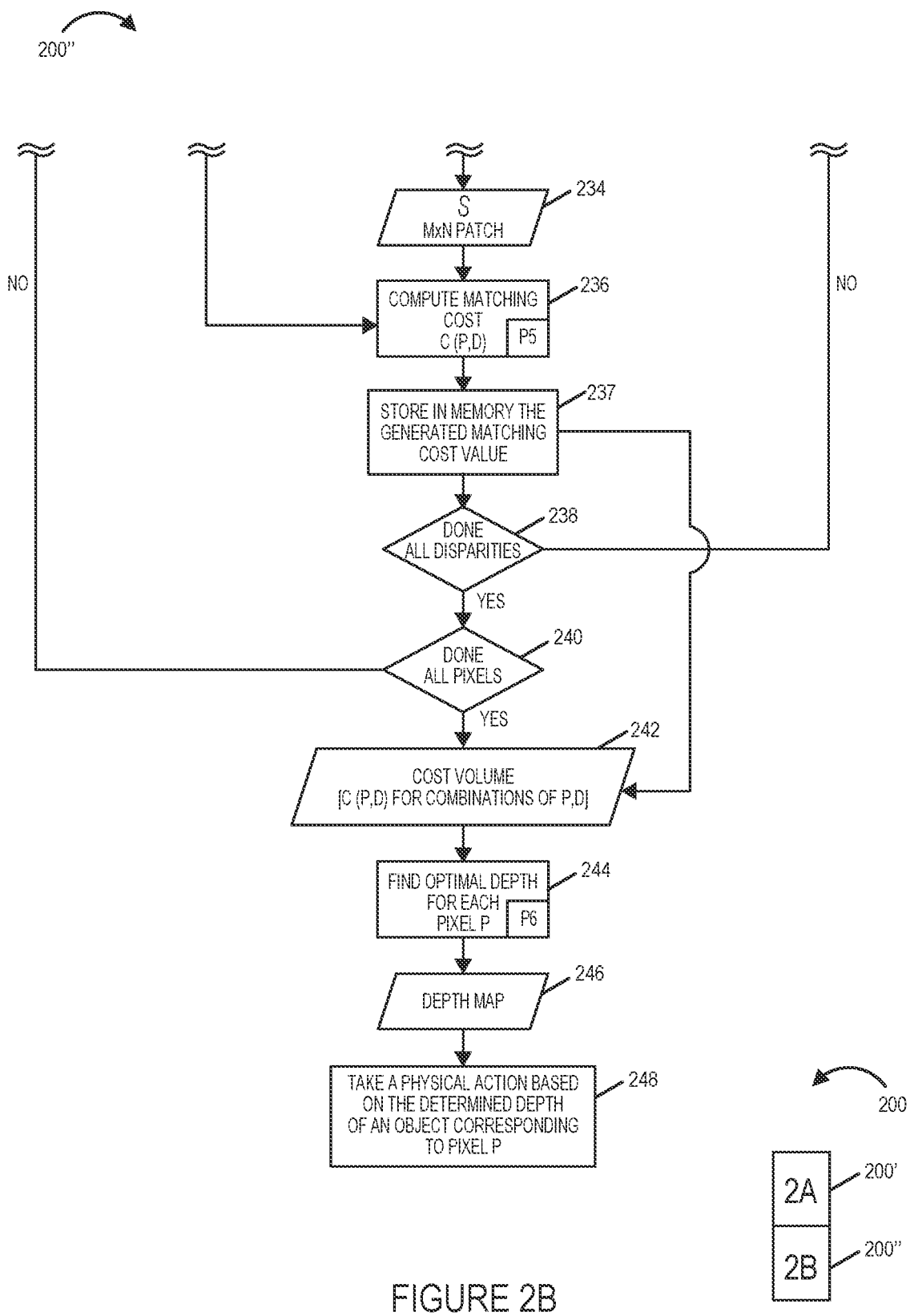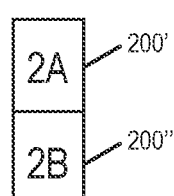
FIGURE 2B
FIGURE 2

METHODS AND APPARATUS FOR USING FILTERING TO IMPROVE IMAGE PATCH MATCHING AND/OR FOR USING DEPTH INFORMATION GENERATED FROM STEREO IMAGES

RELATED APPLICATIONS

The present invention claims the benefit of U.S. provisional patent application Ser. No. 63/055,167 filed Jul. 22, 2021 which is hereby expressly incorporated by reference in its entirety.

FIELD

The present application relates to method and apparatus for making depth determinations from images and/or using depth information and, more particularly, to methods and apparatus for improving patch matching used for stereo depth determination and/or using the results of depth determinations, e.g., to control a vehicle.

BACKGROUND

Stereo depth determination involves using images captured by different cameras which are spatially offset from one another to determine depth, e.g., the distance to an object captured by the spatially separated cameras.

For the problem of depth perception via stereo, a key step is the identification, given a pixel in a reference image, the corresponding pixels in other images. Once corresponding pixels have been identified, the depth of the part of the object imaged by the reference pixel can be determined given known geometry of the cameras involved. Identifying correspondences, however, is challenging. Cameras over which correspondences are sought might not have the same characteristics (focal length, sensor sensitivity, etc.); there might be differences in focusing (and hence, differences in the amount of blurring seen for any given object). The problem of differing blur is even more egregious when there is contamination present in the external assembly—e.g., dirt deposited on a lens—because with this, the effects are local. Thus, parts of an object may appear in focus in one camera (camera 1) but not the other (camera 2), and other parts of this same object might appear in focus in camera 2 and not in camera 1. FIG. 1 shows an example of such a case.

FIG. 1 is a drawing showing images captured from two cameras wherein both cameras are affected by contamination, but the regions affected are different.

The patch A 106 in camera 1 is unaffected by contamination and is in focus. As we search for a match for it, the true patch in camera 2 is blurred as it is affected by contamination 112. The opposite is true as we search for a match for patch B 108 of camera 1.

In view of the above it should be appreciated that there is a need for methods and apparatus which can be used to address the problem of differences in blurring between images captured by different cameras which are to be used for stereo depth determinations.

SUMMARY

Methods and apparatus for processing images captured by cameras for use in stereo depth determinations are described and for using depth information generated by processing such images.

In various embodiments images are captured using a reference camera and one or more additional cameras. In some embodiments the cameras are controlled to capture the images in parallel, e.g., at the same time. In some but not necessarily all embodiments the cameras are vehicle mounted cameras and the vehicle is controlled based on depth information generated from images captured by the cameras on the vehicle. Vehicle control includes one or more of speed control braking control, and/or steering control.

Filtering of one or more images, is implemented as part of a patch matching process to reduce the risk of erroneous matches, e.g., due to image blur in one image but not another, and thus increase the chance of accurate matches between captured images which can improve the accuracy of depth determinations as compared to embodiments where such filtering is not used.

In various embodiments a patch generated from an areas of a reference image is compared to a corresponding patch of another camera image, e.g., an image captured by a second camera. In order to address the problem of different amounts of blurring between the reference image and the additional image, filtering is used in some embodiments when generating a comparison patch from a second image to be compared to a reference patch of a reference image.

The filtering maybe and sometimes is implemented on a patch basis where a candidate patch is generated from an image to be compared to a reference image patch and filtered, e.g., by performing a sharpening or blurring operation to the candidate image patch, e.g., from a second image. The filtered patch is used in the comparison.

The amount of blurring or sharpening that is applied to generate the candidate patch from a portion of the second image depends, in some embodiments, on the relative difference between the portion of the second image used in generating the candidate patch and the reference patch. In other words, the amount of sharpening and/or blurring of a portion of the second image used to generate the candidate patch used in the comparison is dependent on both the content of the reference patch as well as the candidate patch, .e.g., the pixel values of the second image prior to filtering that are used in the filtering operation to generate the final candidate patch which is compared to a reference patch.

For different disparity possibilities, different portions of the additional, e.g., second, image will correspond to the reference image patch. By generating match cost values, e.g., a value indicating how closely a filtered candidate patch matches a reference patch, for different disparities, the most likely disparity, and thus distance, from the reference camera to the object surface to which the reference patch corresponds can be and sometimes is determined. The determined distance can and sometimes is used to implement a vehicle control operation, e.g., to trigger a braking operation to avoid a collision or maintain a desired vehicle distance from an object which may be stationary or moving (e.g., another moving vehicle).

One exemplary embodiment is directed to a method, comprising the steps of operating a processor to perform, for a pixel location p in a reference image and a disparity d, the steps of:

i) determining, for the disparity d, a corresponding pixel location (q) in a second image corresponding to a pixel location (p) in a reference image;

ii) determining filter coefficients for filtering a candidate patch, for the disparity d, of said second image that includes said determined corresponding pixel location (q);

iii) filtering the candidate patch for the disparity d using a filter implemented using the determined filter coefficients to generate a filtered candidate patch for the disparity d;

iv) computing a matching cost value based on how well the filtered candidate patch for the disparity d matches a reference patch;

v) storing in memory the generated matching cost value for pixel location p and disparity d;

repeating steps i), ii), iii), iv) and v) for at least one other disparity d; and determining a depth for pixel p based on the computed matching cost values corresponding to pixel p.

As part of the process, the processor may and sometimes does control capture of images which are used as input to the process, e.g., capture of a reference and a second image using a reference camera and second camera, respectively. The cameras may be and sometimes are mounted on the front of a vehicle but other mounting locations, e.g., side and rear of the vehicle, are also possible and used in some embodiments.

A depth map is generated from the depths determined for multiple pixels. The generated depth map is used in some embodiments to control a vehicle, e.g., to apply brakes and/or control vehicle speed to avoid a collusion or reduce the risk of a collision. While explained in the context of a vehicle control system, the depth map generation process of the present application can be used in a wide range of applications including the generating of 3D models based on captured images and/or other applications and thus should not be interpreted as being limited to vehicle applications.

Numerous variations on the above described methods and apparatus are discussed and described in the detailed description which follows.

BRIEF DESCRIPTION OF THE FIGURES

FIG. 2B is a second part of a flowchart showing the method of obtaining a depth map from two cameras FIG. 2 shows how FIGS. 2A and 2B are to be combined to form the flowchart showing the method of obtaining a depth map from two cameras.

DETAILED DESCRIPTION

Figure 1:
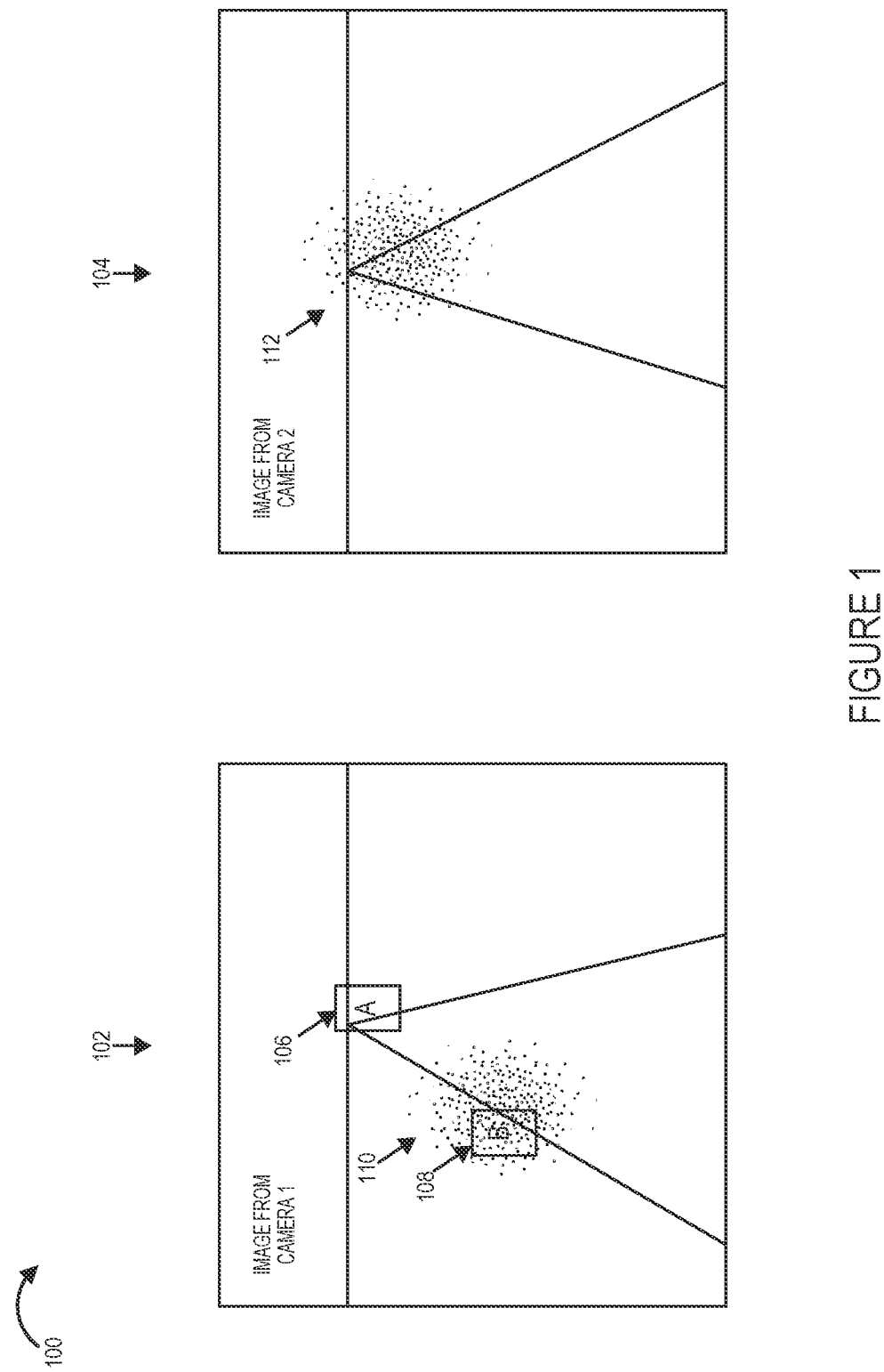
FIG. 1 is a drawing showing images from two cameras used for estimating depth in a scene.

FIG. 1 is a drawing 100 showing images (102, 104) from two cameras used for estimating depth in a scene. Both cameras are affected by contamination, but the regions affected obviously are not the same. Local processing, e.g., filtering of one or more images, is implemented as part of the matching process to reduce the risk of erroneous matches. In image 102 from camera 1 the region 110 around patch B 108 is affected by contamination. In image 104 from camera 2 the region 112 is affected by contamination. Region 112 of image 104 corresponds to the area around patch A 106 in image 102, which is not affected by contamination.

While in some embodiments certain effects of gains/sensitivities are addressed on a global level, e.g., based on camera settings and/or by compensating or correcting for such differences in an image preprocessing step which occurs after image capture and before pixel processing discussed in FIG. 2, it is desirable to address some image effects locally, e.g., by compensating for blurring. By addressing blur issues the method shown in FIG. 2 tries to reduce and/or minimize the possibility of false matches and hence incorrect depths determinations that can result from such false matches.

Figure 2A:
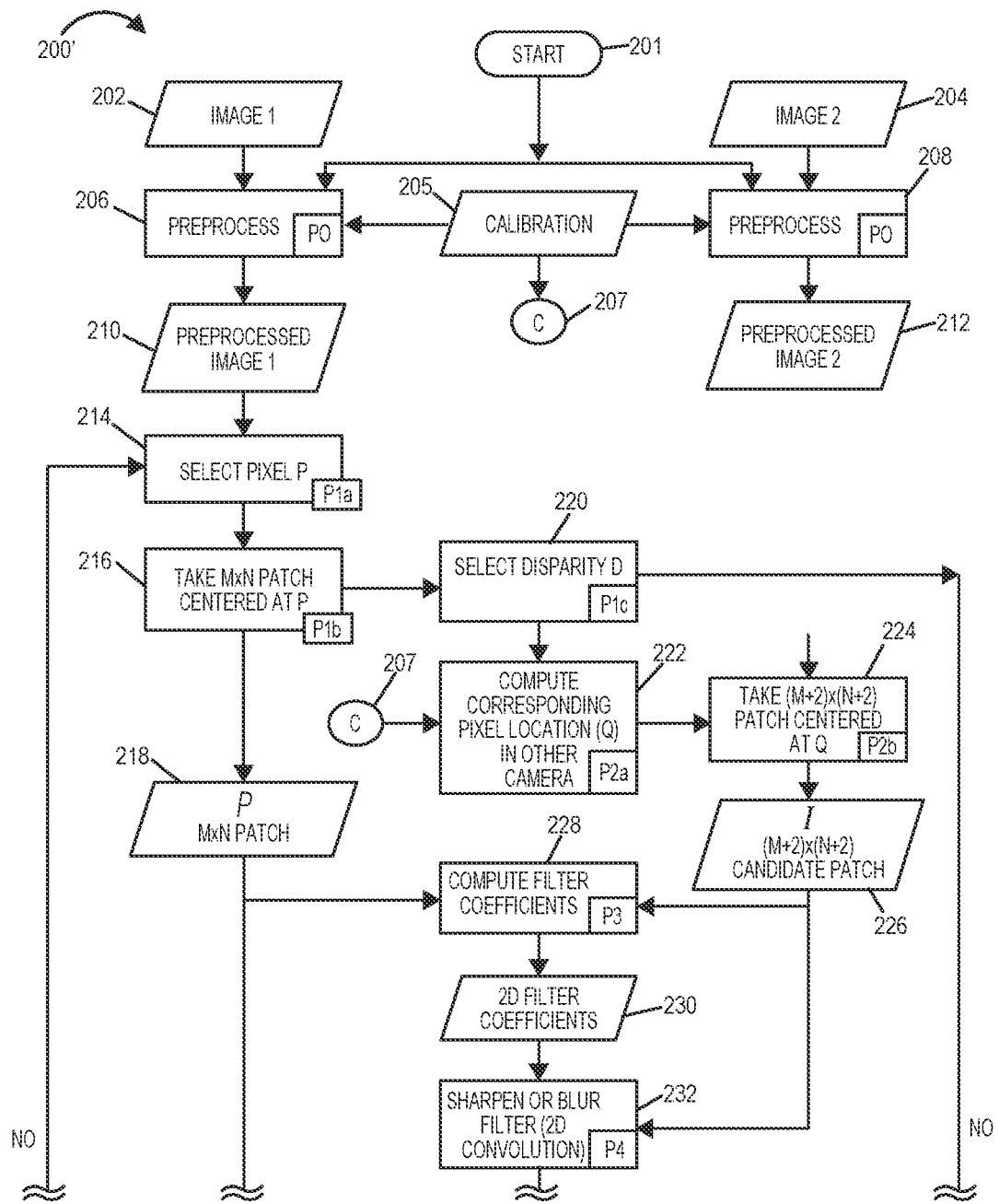
FIG. 2A is a first part of a flowchart showing the method of obtaining a depth map from two cameras.

FIG. 2, which comprises the combination of FIGS. 2A and 2B, is a flowchart 200 showing the method of obtaining a depth map from two cameras. Operation of the exemplary method starts in step 201 and proceeds to steps 206 and 208.

Preprocessing, referred to as processing operation P0, is performed in steps 206 and 208, which may be performed in parallel.

P0: We start by preprocessing the images from the cameras (image 1 202 and image 2 204) including any contamination to mitigate global scale differences that can be mitigated—e.g., by balancing the intensity of the individual R/G/B pixels so that any color differences in the cameras do not show up as mismatches. Any known distortion introduced by the lenses could also be removed during this step if the respective distortion profiles of the two optical systems have been calibrated and this calibration (205) is known. The output of step 206 is pre-processed image 1 210, and the output of step 208 is pre-processed image 2 212.

Reference patch and disparity operations, referred to as operations P1a, P1b, and P1c, will now be described. P1a/b/c: Now the method proceeds towards finding unique matches for each pixel in one of the cameras deemed as the reference camera. To search for the closest match for each reference pixel p in the reference camera, we sweep over depth (or equivalently, disparity) hypotheses and find the cost of matching a candidate patch in the source corresponding to each depth (or disparity) hypothesis.

Disparity refers to the difference between the respective positions of matching pixels. It is similar to the difference in position as seen by our two eyes of a finger held close to the face—closer the finger, more the disparity. The sweep over depth is, thus, equivalent to a sweep over disparity, which is related by an inverse proportionality constant to depth. In the text, we use depth and disparity interchangeably.

In step 214 (operation P1a) a pixel p in the reference image (pre-processed image 1 210) is selected. Then in step 216 (operation P1b) a reference patch is taken as the M×N patch P 218 centered at the location of pixel p. In step 220 (operation P1c), a disparity is selected. Operation proceeds from step 220 to step 222.

Locate candidate patch operations, referred to as processing operations P2a and P2b, will now be described.

P2 (P2a/b): For a given combination of the pixel location p in the reference camera and the disparity hypothesis d, it is possible to calculate the pixel location q if the appropriate camera geometry is specified by calibration (205). In step 222 (operation P2a) a corresponding pixel location q in the other camera (camera 2's pre-processed image 2 212) corresponding to pixel p is computed using the calibration information 205. Operation proceeds from step 222 to step 224. In step 224 (operation P2b), a candidate patch is taken as the (M+2)×(N+2) patch I 228 centered at the location of pixel q.

Sharpen/blur filter determination operation, referred to as processing operation P3, is performed in step 232. In step 228 filter coefficients are calculated. P3: As we have mentioned before, the reference patch and the candidate patch, despite the preprocessing step(s) performed in P0 will suffer from local effects that will differ across patch combinations. E.g., it could happen that the reference patch is affected by the presence of some contamination (e.g. dirt accumulation) which one certainly cannot calibrate for but the candidate patch does not suffer any such degradations. Patch B 108 in camera 1 in FIG. 1 is an example of such an occurrence. In such a case, the reference patch can be expected to look blurry as compared to its true unique match in the other camera. A naive comparison with even the true patch will falsely lead to a mismatch. However, we were to blur the candidate patch as well, we could get its appearance to be closer to the reference patch and be thus able to get better metrics on the patch comparison.

On the flip side, the blurring is more on the non-reference camera, e.g., patch A 106 in camera 1 in FIG. 1. In such a case, we should sharpen the candidate patch before proceeding with finding the matching cost.

Given this context, the amount of blurring or sharpening that is applied to the candidate patch depends on the relative difference between the candidate and the reference patch. In other words, the amount of sharpening and blurring is dependent on both the content of the reference patch as well as the candidate patch.

Figure 4:
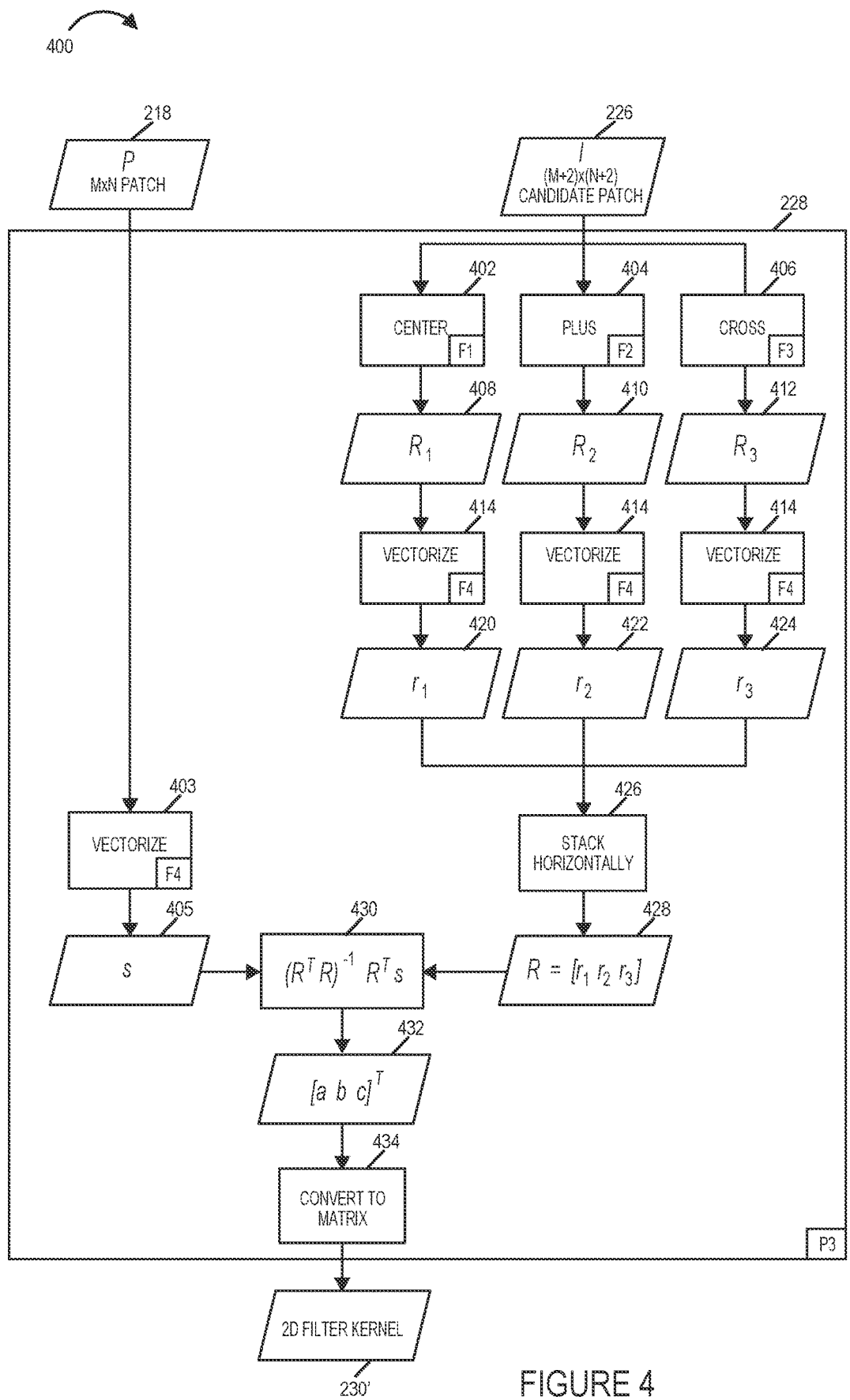
FIG. 4 is a flowchart showing the steps involved in the generation of a filtering "kernel".
Figure 5:
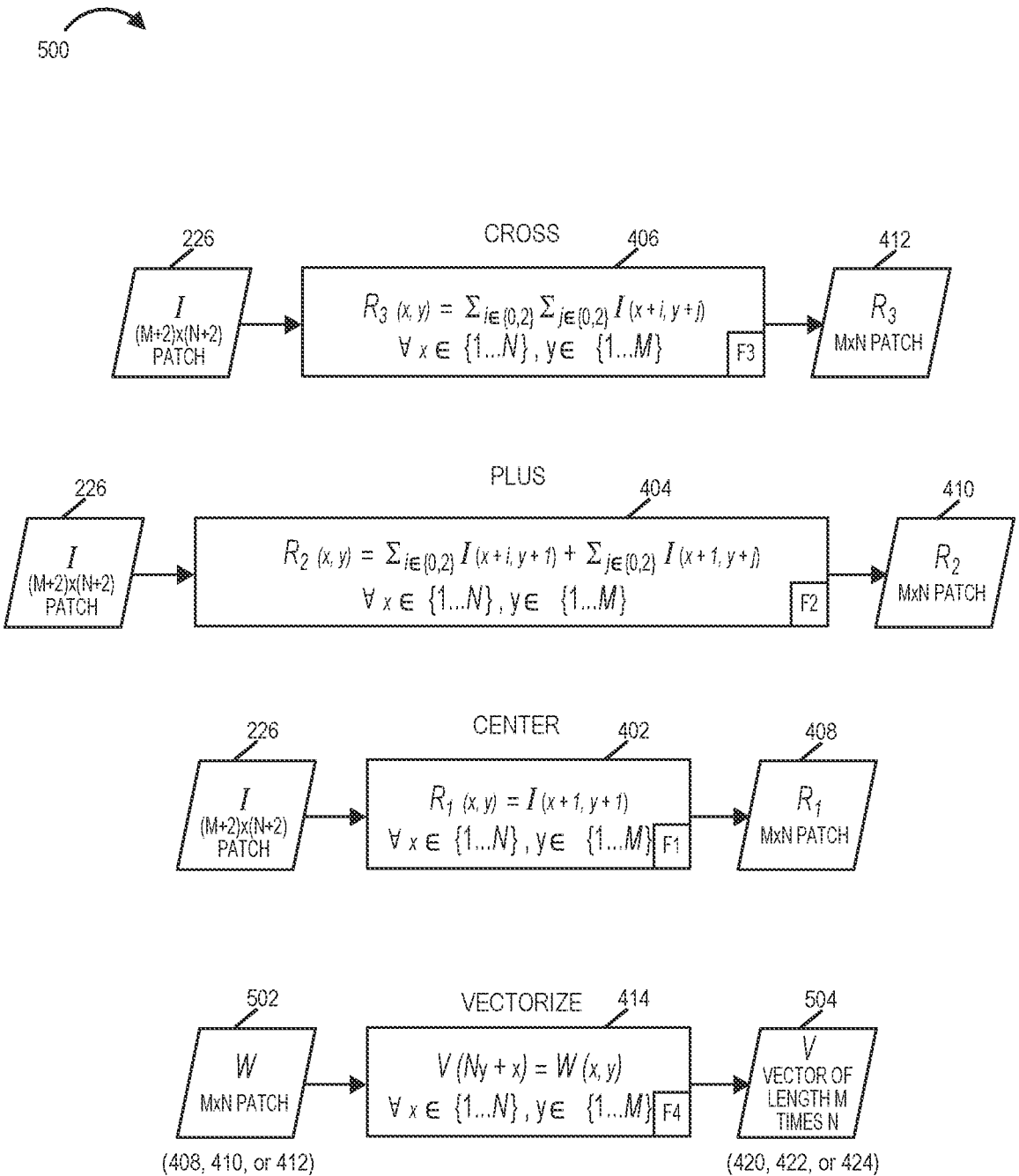
FIG. 5 shows equations corresponding to operations shown in FIG. 4.

The mathematical steps involved in this filtering process are shown in more detail in drawings 400 and 500 of FIGS. 4 and 5. What these steps amount to is determining the filter 230 to apply to the candidate patch I 226 to equalize the effects of differing blur seen by the two patches (reference patch P 230 and candidate patch I 226. As noted, the filter determination is between selection of a sharpening or blurring filter with the strength of the filtering varying based on relative difference in blur seen for the two patches.

Filter candidate patch operation, referred to as processing operation P4, is performed in step 232.

P4: This step 232 is merely the application of the filter 230 computed in the previous step 228 to the candidate patch 226 and results in S candidate patch 234.

Cost computation operation, referred to as processing operation P5, is performed in step 236.

P5: This step 236 computes a cost metric C(p,d) that quantifies how close the candidate patch at q is to the reference patch at p. Since q itself was computed using the disparity d, and the pixel location p, the cost metric could be seen as tied to the combination of p and disparity d. Operation proceeds from step 236 to step 237, in which the processor stores in memory the generated matching cost value. Operation proceeds from step 237 to step 238. If there are other disparities to test, then operation proceeds from step 238 to step 220, in which another disparity value is selected. However, if there are not any other disparity values to test, then operation proceeds from step 238 to step 240. In step 240 a determination is made as to whether or not there are additional pixels to evaluate (in preprocessed image 1). If there are additional pixels to process, then operation proceeds from step 240 to step 214, in which another pixel p is selected from the preprocessed image 1 210. However, if there are no additional pixels to process (all pixels have been done), then, the cost volume 242 is complete for combinations of p,d, and operation proceeds from step 240 to step 244 in which the optimal depth for each pixel p is determined and depth map 246 is generated.

Depth map computation operation, referred to as processing operation P6, is performed in step 244.

P6: The costs for each reference pixel p for each disparity hypothesis d are collected in what is called a cost-volume 242. A simple way to get the depth map 246 from the cost-volume 242 is to simply take the disparity which leads to the minimum cost for a pixel p and then map this disparity to depth corresponding to pixel p. However, the cost-volume 242 can be further post-processed taking into account the neighborhood of a pixel to obtain the final depth (optimal depth) that is assigned to this pixel.

Operation proceeds from step 244 to step 248 in which a physical action is taken based on the determined depth of an object corresponding to pixel p. the depth of the object corresponding to pixel p is a distance from the reference camera to a surface of the object, e.g., a processor in a vehicle controls a braking or steering system in the vehicle to take a physical action based on the determined depth of an object corresponding to pixel p. In some embodiments, the depth of the object corresponding to pixel p is a distance from the reference camera to a surface of the object, e.g., the surface of another vehicle. In some embodiments, said physical action is device control action (e.g., braking and/or turning action intended to avoid a collision or impact).

FIG. 2 is a flowchart for computing depth using two cameras in the presence of non-global differing global effects across the cameras Details of computation of filter coefficients will now be discussed. Drawings 400 and 500 of FIGS. 4 and 5 show the mathematical operations involved in the filter coefficient computation.

The idea is to find coefficients that will lead to an optimal or near optimal amount of blurring or sharpening that is to be applied to a candidate patch that will bring it close to the reference patch. In other words, we are looking to assign values of a, b and c of a filtering kernel as shown in drawing 300 of FIG. 3 which will result in the closest match between the two patches. A brute-force search over all possible values is prohibitive. The operations depicted in FIGS. 4 and 5 achieve the task of getting a closed form solution to the optimal values of a, b, c given the pixel values in the two patches.

Figure 3:
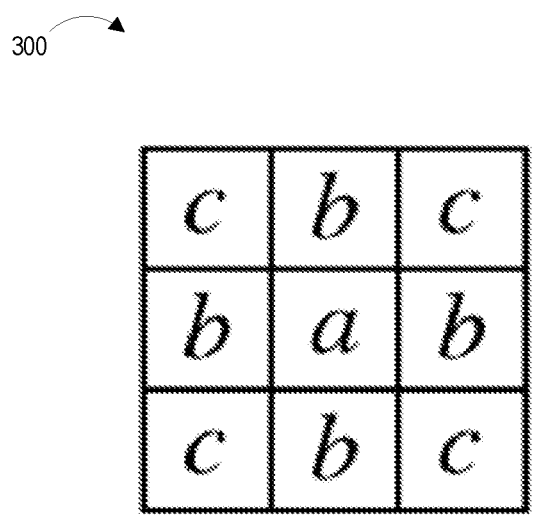
FIG. 3 shows a filter kernel used in some embodiments to perform a filtering operation on a portion of a second image as part of generating a candidate patch to be compared to a reference patch.

FIG. 3 shows a drawing 300 showing how the three filter coefficients a, b, c are used to form a 3×3 filtering "kernel". The amount of sharpening or blurring depends on the exact values of a, b, c.

We start with the values in P(x, y) in the reference patch 218 where x and y refer to the pixel locations within the patch (not the image as a whole) and values I(x,y) in the candidate patch 226, where x and y again refer to the pixel locations in the candidate patch. Notice, because of the difference in the length (M vs (M+2)) and height (N vs (N+2)) of the patches, the acceptable values of x and y for the reference patch and the candidate patch span a different range.

Blurring and sharpening are neighborhood dependent operations. And in order to find the optimal coefficients, we use statistics over the candidate patch on how a pixel in the patch is affected by its neighborhood. This is the idea behind taking the "Center" pixels (i.e., the unaltered pixels themselves), the "Plus" pixels (a respective sum of the values of the pixels to the top, bottom, left and right for every interior pixel) and the "Cross" pixels (a respective sum of the values of the pixels located diagonally with respect to every interior pixel). Comparing the statistics of the unaltered and the neighboring pixel values to the reference patch allows us to compute the coefficients to manipulate a pixel's neighborhood values to achieve the appropriate blurring or sharpening.

FIG. 4 is a Flowchart showing the steps involved in the generation of the filtering "kernel" (processing block P3 of FIG. 2). FIG. 5 is a diagram 500 shows equations corresponding to operations shown in FIG. 4. Reference numbers which are used in FIG. 4 are used in FIG. 5 to identify equations or data that can be used in the correspondingly numbered element shown in FIG. 4.

Various variations are possible. Consider the method of obtaining a depth map from two cameras, with one camera serving as the reference camera. For robustness, the camera serving as reference could be swapped with the other camera and the two cost volumes combined in suitable fashion to generate a combined depth map. In fact, any number of cameras could be used in the scheme. To check consistency, the cost volumes (the data immediately prior to obtaining the depth map in the flowchart below) from multiple different pairs of cameras (e.g., A-B, B-A, A-C, C-A, B-C, C-B) could be analyzed before generating the depth map. The depth map itself might be used to seed the search for corresponding patches for later frames or in the current frame, in case the search should be redone with different preprocessing steps prior to the extraction of patches.

Figure 6:
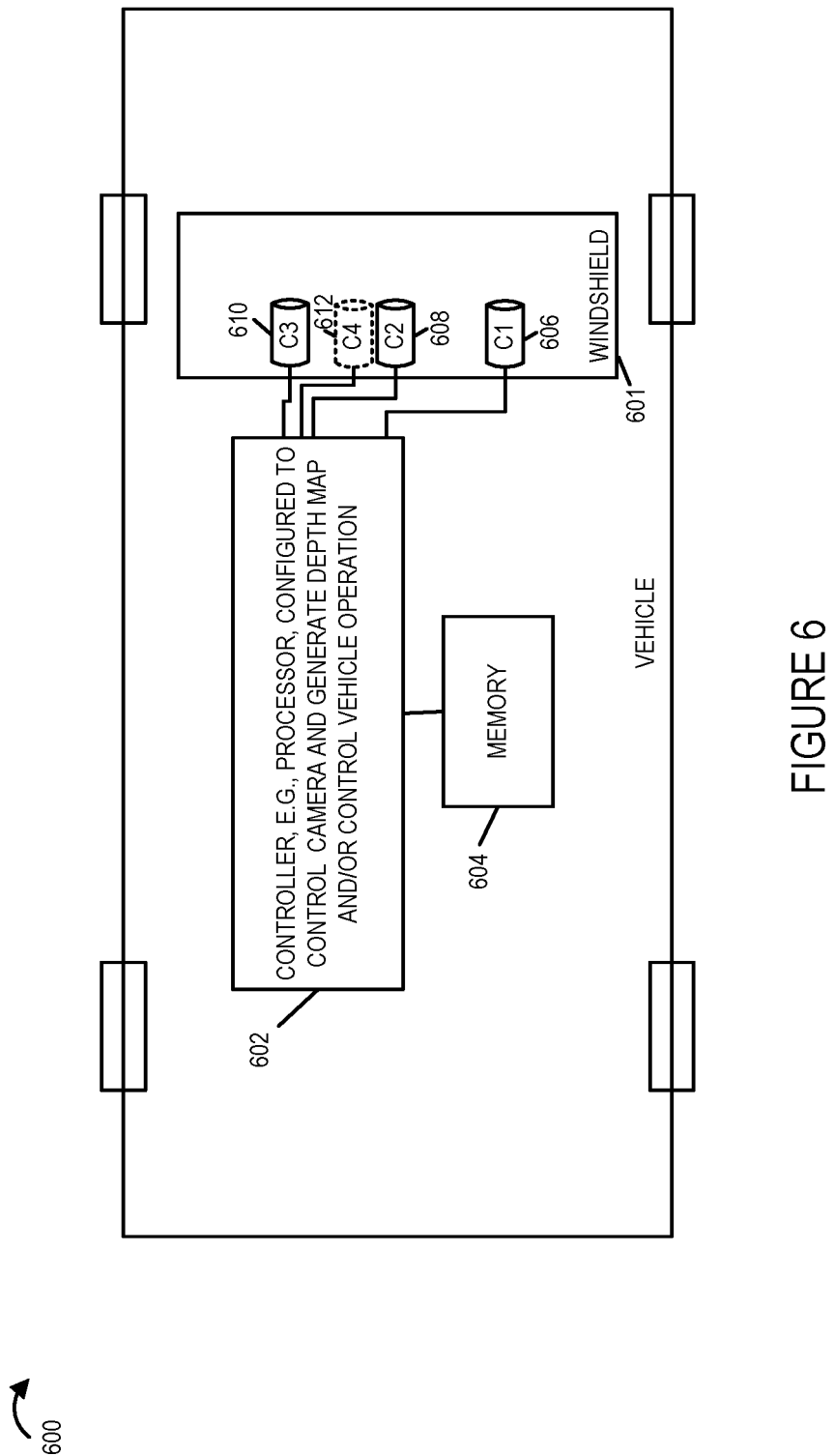
FIG. 6 is a drawing of an exemplary vehicle which supports image capture using multiple cameras, image processing in accordance with the invention to identify matching portions of images and to produce depth information, and performs vehicle control vehicle operations based on the depth information obtained from the image processing.

FIG. 6 is a drawing of an exemplary vehicle 600 which supports image capture using multiple cameras, image processing in accordance with the invention to identify matching portions of images and to produce depth information, and vehicle control vehicle based on the depth information obtained from the image processing. Exemplary vehicle 600 includes a plurality of cameras, camera 1 (C1) 606, camera 2 (C2) 608, camera 3 (C3) 610, and camera 4 (C4) 612, which capture images through a windshield 601. In one exemplary embodiment cameras C1 606, C2 608 and C3 610 are along a horizontal axis, and cameras C2 608 and C4 612 are along a vertical axis. Exemplary vehicle 600 further includes a windshield 601, a controller 602, e.g., a processor, configured to control camera operation including camera synchronization, identify matching portions of images to produce depth information, generate a depth map, and/or control vehicle operation, memory 604. The first camera C1 606 is mounted inside the vehicle and faces outward to capture images as viewed through the windshield 601; the second camera C2 608 is mounted inside the vehicle and faces outward to capture images as viewed through the windshield 601; the third camera C3 610 mounted inside the vehicle and faces outward to capture images as viewed through the windshield 601; and the fourth camera C4 612 is mounted inside the vehicle and faces outward to capture images as viewed through the windshield 601.

Controller 602 is coupled to each of the cameras (C1 606, C2 608, C3 610, C4 612). Controller 602 controls the cameras to initiate image capture, e.g., in synchronization.

Controller 602 receives images captured by each of the cameras (C1, C2, C3, C4). Controller 602 identifies matching portions of images, e.g. captured from different cameras at the same time. Controller 502 uses matching portions of images to produce depth information and generate a depth map. In some embodiments, controller 602 decides which of the captured images to use in generating a depth map and/or how to weight content from a captured image in generating a depth map. In some embodiments, controller 602 controls a vehicle control operation, e.g. one of a direction, braking, or speed control operation, to be performed in response to a generated depth map. In various embodiments, controller 602 uses the depth map information to perform collision avoidance operations and/or perform autopilot operations.

Figure 7:
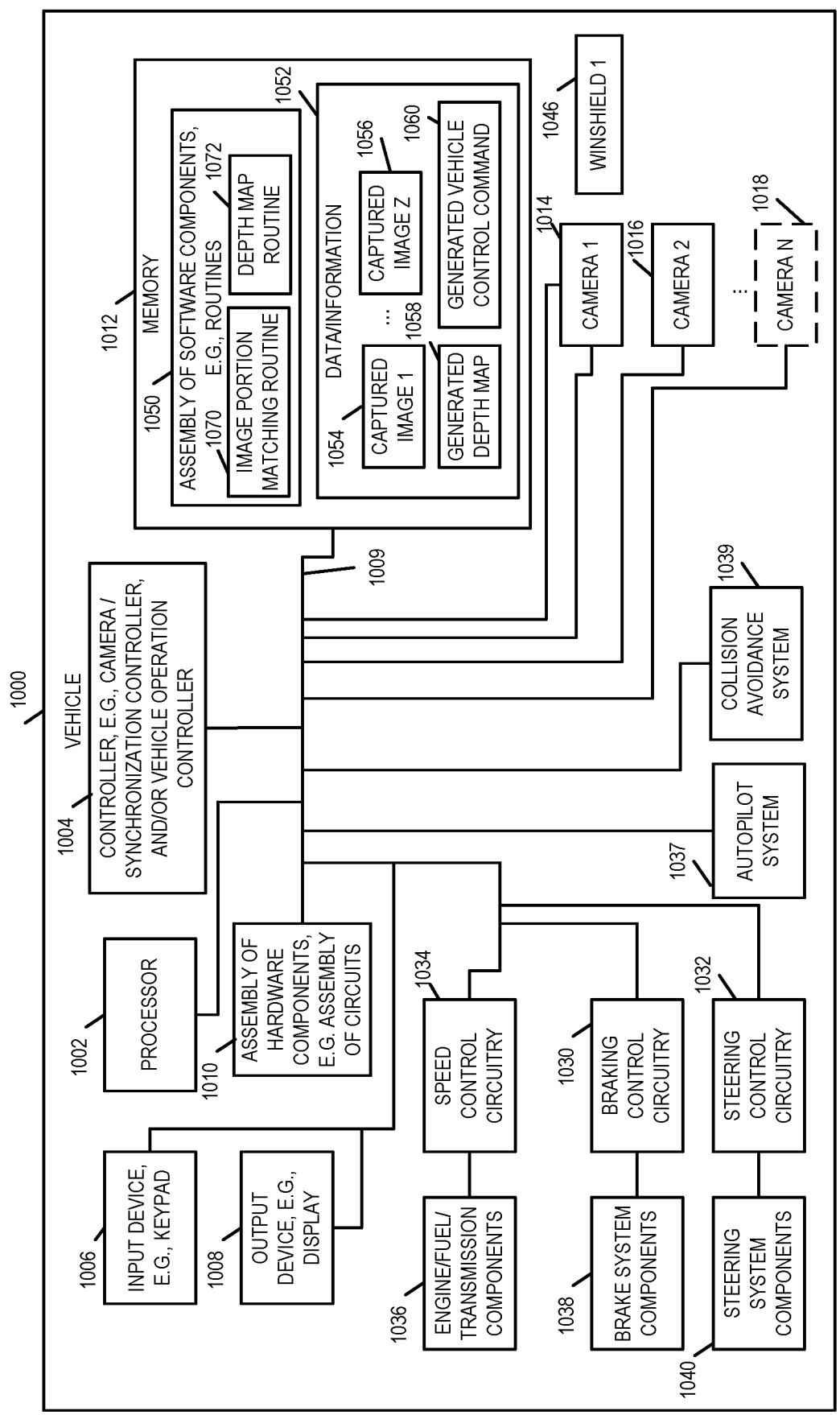
FIG. 7 is a drawing of an exemplary vehicle which supports image capture using multiple cameras, image processing in accordance with the invention to identify matching portions of images and to produce depth information and vehicle control based on the depth information obtained from the image processing.

FIG. 7 is a drawing of an exemplary vehicle 1000 which supports image capture using multiple cameras, image processing in accordance with the invention to identify matching portions of images and to produce depth information and vehicle control vehicle based on the depth information obtained from the image processing. Exemplary vehicle 1000 includes a processor 1002, e.g., a CPU, a controller 1004, e.g., a camera/synchronization controller and/or vehicle operation controller 1004, an input device 1006, e.g., a keypad, an output device 1008, e.g., a display, an assembly of hardware components 1010, e.g., an assembly of circuits, memory 1012, a plurality of cameras (camera 1 1014, camera 2 1016, . . . , camera N 1018), speed control circuitry 1034, braking control circuitry 1030, steering control circuitry 1032, an autopilot system 1037, and a collision avoidance system 1039 coupled together via a bus 1009 over which the various components may interchange data and information. In some embodiments, the autopilot system 1037 and/or the collision avoidance system 1039 are coupled together and/or to the speed control circuitry 134, braking control circuitry 1030 and/or steering control circuitry. Vehicle 1000 further includes a windshield 1 1046, e.g., a front window, through which the cameras capture images. Vehicle 1000 further includes engine/fuel/transmission components 1036, e.g., a motor, internal combustion and/or electric, computer controlled fuel injection system, electronically controlled transmission, etc., which is coupled to speed control circuitry 1034. Vehicle 1000 further includes brake system components 1038, e.g., ABS system, brake sensors, wheel motion sensors, wheel position sensors, actuators, hydraulic components, electronically controlled brakes, etc, coupled to braking control circuitry 1030. Vehicle 1000 further includes steering system components 1040, e.g., rack and pinion unit, steering input controls and steering drive components including motors, etc., coupled to steering control circuitry 1032. In some embodiments, the steering control circuitry 1034, braking control circuitry 1030 and/or steering control circuitry 1032 is part of an autonomous or semi-autonomous driving control system and/or an assisted driving control system.

Memory 1012 includes an assembly of software components 1050, e.g., an assembly of software routines or software modules, and data/information 1052. Assembly of software components 1050 includes a image portion matching routine 1070 and a depth map routine 1072. Data/information 1052 includes captured images (captured image 1 1054, . . . , captured image Z 1056), a generated depth map 1058, e.g., generated from captured images, and a generated vehicle control command 1060, e.g., to be sent to speed control circuitry 1034, braking control circuitry 1030, steering control circuitry, autopilot system 1037 and/or collision avoidance system 1039, e.g. in response to a detected change and/or problem, detected by analyzing the generated depth map, e.g., a stopped or disabled truck suddenly is detected in front of the vehicle resulting in a control command for avoidance.

Vehicle 1000 is, e.g., vehicle 600 of FIG. 6 a vehicle implementing the method of flowchart 200 of FIG. 2, and/or a vehicle implementing novel methods and/or apparatus described in this application and/or shown in any of the Figures. Vehicle 1000 is, e.g., any of: a land vehicle, e.g., a car, truck, motorcycle, bicycle, train, unmanned terrestrial vehicle, etc., a sea or water vehicle, e.g., boat, ship, unmanned water vehicle, etc., amphibious vehicle, air vehicle, e.g., airplane, helicopter, glider, unmanned aerial vehicle, etc.

Various exemplary numbered embodiments are discussed below. The numbered embodiments are exemplary, and the application is not limited to such embodiments.

Numbered List of Exemplary Method Embodiments

Method Embodiment 1 A method, comprising: operating a processor to perform, for a pixel location p in a reference image and a disparity d, the steps of: i) determining (222), for the disparity d, a corresponding pixel location (q) in a second image corresponding to a pixel location (p) in a reference image; ii) determining (228) (e.g., computing) filter coefficients for filtering a candidate patch (e.g., (M+2)×(N+2) candidate patch centered at q), for the disparity d, of said second image that includes said determined corresponding pixel location (q); iii) filtering (232) the candidate patch for the disparity d using a filter implemented using the determined filter coefficients to generate a filtered candidate patch (e.g., M×N filtered candidate patch) for the disparity d; iv) computing (236) a matching cost value based on how well the filtered candidate patch for the disparity d matches a reference patch (e.g., M×N reference patch centered at p); v) storing (237) in memory the generated matching cost value for pixel location p and disparity d; repeating (238—No path) steps i), ii), iii), iv) and v) for at least one other disparity d; and determining (244) a depth for pixel p based on the computed matching cost values corresponding to pixel p.

Method Embodiment 2 The method of Method Embodiment 1, wherein said step of filtering (232) the candidate patch for the disparity d using a filter implemented using the determined filter coefficients to generate a filtered candidate patch for the disparity d includes performing one of a blurring filtering operation and a sharpening filtering operation.

Method Embodiment 3 The method of Method Embodiment 1, wherein determining (228) (e.g., computing) filter coefficients for filtering the candidate patch, for the disparity d, of said second image that includes said determined corresponding pixel location depends on the content of both the reference patch as well as the corresponding candidate patch.

Method Embodiment 4 The method of Method Embodiment 3, wherein the amount of sharpening or blurring performed by said filtering (232) is a function of a difference between the candidate patch and corresponding reference patch.

Method Embodiment 5 The method of Method Embodiment 4, wherein said difference between the candidate patch and the corresponding reference patch is an amount of difference in blur (e.g., a relative difference in blur).

Method Embodiment 6 The method of Method Embodiment 5, further comprising: generating (244) a depth map from pixel depths determined for multiple pixels in the reference image.

Method Embodiment 7 The method of Method Embodiment 1, further comprising: taking (248) a physical action based on the determined depth of an object corresponding to pixel p.

Method Embodiment 8 The method of Method Embodiment 7, wherein the depth of the object corresponding to pixel p is a distance from the reference camera to a surface of the object.

Method Embodiment 9 The method of Method Embodiment 7, further comprising: wherein said physical action is device control action (e.g., braking and/or turning action intended to avoid a collision or impact).

Method Embodiment 10 The method of Method Embodiment 1, wherein the reference patch and the filtered candidate patch are the same size (e.g., M×N), and wherein the candidate patch is larger than the reference patch (e.g., (M+2)×(N+2)).

Method Embodiment 11 The method of Method Embodiment 1, wherein determining (228) (e.g., computing) filter coefficients for filtering a candidate patch for the disparity d, of said second image that includes said determined corresponding pixel location (q) includes: comparing statistics of unaltered pixels of the candidate patch and neighboring pixel values of the candidate patch to the reference patch.

Method Embodiment 12 The method of Method Embodiment 1, wherein determining (228) (e.g., computing) filter coefficients for filtering a candidate patch for the disparity d, of said second image that includes said determined corresponding pixel location (q) includes: determining said filter coefficients based on pixel values from a portion of the second image which is larger than the reference patch.

Numbered List of Exemplary System Embodiments

System Embodiment 1 A system, comprising: memory storing a reference image and a second image; and a processor configured to perform, for a pixel location p in a reference image and a disparity d, the steps of: i) determining (222), for the disparity d, a corresponding pixel location (q) in a second image corresponding to a pixel location (p) in a reference image; ii) determining (228) (e.g., computing) filter coefficients for filtering a candidate patch (e.g., (M+2)×(N+2) candidate patch centered at q), for the disparity d, of said second image that includes said determined corresponding pixel location (q); iii) filtering (232) the candidate patch for the disparity d using a filter implemented using the determined filter coefficients to generate a filtered candidate patch (e.g., M×N filtered candidate patch) for the disparity d; iv) computing (236) a matching cost value based on how well the filtered candidate patch for the disparity d matches a reference patch (e.g., M×N reference patch centered at p); v) storing (237) in memory the generated matching cost value for pixel location p and disparity d; repeating (238—No path) steps i), ii), iii), iv) and v) for at least one other disparity d; and determining (244) a depth for pixel p based on the computed matching cost values corresponding to pixel p.

System Embodiment 2 The system of System Embodiment 1, wherein said step of filtering (232) the candidate patch for the disparity d using a filter implemented using the determined filter coefficients to generate a filtered candidate patch for the disparity d includes performing one of a blurring filtering operation and a sharpening filtering operation.

System Embodiment 3 The system of System Embodiment 1, wherein determining (228) (e.g., computing) filter coefficients for filtering the candidate patch, for the disparity d, of said second image that includes said determined corresponding pixel location depends on the content of both the reference patch as well as the corresponding candidate patch.

System Embodiment 4 The system of System Embodiment 3, wherein the amount of sharpening or blurring performed by said filtering (232) is a function of a difference between the candidate patch and corresponding reference patch.

System Embodiment 5 The system of System Embodiment 4, wherein said difference between the candidate patch and the corresponding reference patch is an amount of difference in blur (e.g., a relative difference in blur).

System Embodiment 6 The system of System Embodiment 5, wherein the processor is further configured to: generate (244) a depth map from pixel depths determined for multiple pixels in the reference image.

System Embodiment 7 The system of System Embodiment 1, wherein the processor is further configured to: take (248) a physical action based on the determined depth of an object corresponding to pixel p.

System Embodiment 8 The system of System Embodiment 7, wherein the depth of the object corresponding to pixel p is a distance from the reference camera to a surface of the object.

System Embodiment 9 The system of System Embodiment 7, wherein said physical action is device control action (e.g., braking and/or turning action intended to avoid a collision or impact).

System Embodiment 10 The system of System Embodiment 1, wherein the reference patch and the filtered candidate patch are the same size (e.g., M×N), and wherein the candidate patch is larger than the reference patch (e.g., (M+2)×(N+2)).

System Embodiment 11 The system of System Embodiment 1, wherein the processor, as part of determining (228) (e.g., computing) filter coefficients for filtering a candidate patch for the disparity d, of said second image that includes said determined corresponding pixel location (q): compares statistics of unaltered pixels of the candidate patch and neighboring pixel values of the candidate patch to the reference patch.

System Embodiment 12 The system of System Embodiment 1, wherein the processor, as part of determining (228) (e.g., computing) filter coefficients for filtering a candidate patch for the disparity d, of said second image that includes said determined corresponding pixel location (q): determines said filter coefficients based on pixel values from a portion of the second image which is larger than the reference patch.

Numbered List of Non-Transitory Computer Readable Medium Embodiments

Non-transitory Computer Readable Medium Embodiment 1 A non-transitory computer readable medium including processor executable instructions which, when executed by a processor, control the processor to perform the steps of: i) determining (222), for the disparity d, a corresponding pixel location (q) in a second image corresponding to a pixel location (p) in a reference image; ii) determining (228) (e.g., computing) filter coefficients for filtering a candidate patch (e.g., (M+2)×(N+2) candidate patch centered at q), for the disparity d, of said second image that includes said determined corresponding pixel location (q); iii) filtering (232) the candidate patch for the disparity d using a filter implemented using the determined filter coefficients to generate a filtered candidate patch (e.g., M×N filtered candidate patch) for the disparity d; iv) computing (236) a matching cost value based on how well the filtered candidate patch for the disparity d matches a reference patch (e.g., M×N reference patch centered at p); v) storing (237) in memory the generated matching cost value for pixel location p and disparity d; repeating (238—No path) steps i), ii), iii), iv) and v) for at least one other disparity d; and determining (244) a depth for pixel p based on the computed matching cost values corresponding to pixel p.

The order of steps is in various flow diagrams is intended to be exemplary and not limiting and to the extent that the steps can be performed in another order such other orders are contemplated and within the scope of this disclosure.

Numerous additional variations on the methods and apparatus of the present invention described above will be apparent to those skilled in the art in view of the above description of the invention. For example, while described in the context of a vehicle mounted system the methods and apparatus for using wipers in combination with multiple captures which are used to generate depth maps can be used for stationary applications as well where an area is monitored and depth information is used for security or control applications. In such cases as in the vehicle mounted embodiment giving greater weight and influence to images captured more recently to the point in time a wiper sweeps and cleans an area in front of a camera can improve reliability as compared to systems which do not take into consideration when a wiper sweeps in front of the surface, e.g., surface of a glass or lens, in front of the camera or cameras capturing the images used in generating environmental depth, e.g., distance, information.

The order in which steps are performed is exemplary and it should be appreciated that images can be captured at different times, e.g., sequentially by different cameras and/or at the same time, e.g., with multiple cameras being controlled to capture images at the same time. In many cases where depth map or depth information is to be generated, the images which are compared, e.g., reference image captured by a reference and images captured by other cameras in the system, the images which are captured to one another are captured at the same time, e.g., in parallel. In this way the images correspond to the vehicle location at the time the set of image are captured.

Various variations are to be considered within the scope of the invention. In various embodiments the camera are implemented as digital cameras as part of a system that includes one or more wipers, receiver/transmitter circuits and logic and/or routines, for implementing the methods of the present invention and/or for transiting captured images or generated composite images or depth maps to other devices for storage or display.

Numerous additional variations and combinations are possible while remaining within the scope of the invention.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits to as modules alone or in combination with other hardware elements. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform one or more of the steps of the above-described method(s).

While described in the context of an apparatus, e.g., vehicle including cameras, at least some of the methods and apparatus of the present invention, are applicable to a wide range of image captures systems and devices including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed or sent to a printer for printing as a photo or permanent document which can be maintained in a file as part of a vehicle, personal or business record. Such records can be and sometimes are useful in documenting vehicle operation.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Various variations are to be considered within the scope of the invention. In various embodiments the camera are implemented as digital cameras as part of a system that includes one or more wipers, receiver/transmitter circuits and logic and/or routines, for implementing the methods of the present invention and/or for transiting captured images or generated composite images or depth maps to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain, e.g., chain being fixed with, in at least some embodiments the covering being a windshield of a vehicle.

Numerous additional embodiments are possible while staying within the scope of the above discussed features.

What is claimed is:

1. A method, the method comprising:
    operating a processor to perform, for a pixel location p in a reference image and a disparity d, the steps of:
        i) determining, for the disparity d, a corresponding pixel location q in a second image corresponding to the pixel location p in a reference image;
        ii) determining filter coefficients for filtering a candidate patch of the second image, for the disparity d, of said second image that includes said determined corresponding pixel location q;
        iii) filtering a single one of: the candidate patch of the second image and a reference patch of the reference image, for the disparity d, using a filter implemented using the determined filter coefficients, to generate a filtered candidate patch for the disparity d, said single one of the candidate patch of the second image and the reference patch of the reference image which is filtered using said filter being the candidate patch of the second image, said filtering including:
            blurring the candidate patch when the reference patch of the reference image is blurrier than the candidate patch and
            sharpening the candidate patch when the reference patch of the reference image is sharper than the candidate patch;
        iv) computing a matching cost value based on how well the filtered candidate patch for the disparity d matches the reference patch;
        v) storing in memory the generated matching cost value for pixel location p and disparity d;
        repeating steps i), ii), iii), iv) and v) for at least one other disparity d; and
    determining a depth for pixel p based on the computed matching cost values corresponding to pixel p.

2. The method of claim 1, further comprising:
    performing a vehicle control operation based on the determined depth.

3. The method of claim 1, wherein determining filter coefficients for filtering the candidate patch, for the disparity d, of said second image that includes said determined corresponding pixel location depends on the content of both the reference patch as well as the corresponding candidate patch.

4. The method of claim 3, wherein the amount of sharpening or blurring performed by said filtering is a function of a difference between the candidate patch and corresponding reference patch.

5. The method of claim 4,
    wherein said difference between the candidate patch and the corresponding reference patch is an amount of difference in blur.

6. The method of claim 5, further comprising:
    generating a depth map from pixel depths determined for multiple pixels in the reference image.

7. The method of claim 1, further comprising:
    taking a physical action based on the determined depth of an object corresponding to pixel p.

8. The method of claim 7, wherein the depth of the object corresponding to pixel p is a distance from the reference camera to a surface of the object.

9. The method of claim 7, wherein said physical action is device control action.

10. The method of claim 1, wherein the reference patch and the filtered candidate patch are the same size, and wherein the candidate patch is larger than the reference patch.

11. The method of claim 1, wherein determining filter coefficients for filtering a candidate patch for the disparity d, of said second image that includes said determined corresponding pixel location q includes:
comparing statistics of unaltered pixels of the candidate patch and neighboring pixel values of the candidate patch to the reference patch.

12. The method of claim 1, wherein determining filter coefficients for filtering a candidate patch for the disparity d, of said second image that includes said determined corresponding pixel location q includes:
determining said filter coefficients based on pixel values from a portion of the second image which is larger than the reference patch.

13. A system, comprising:
memory storing a reference image and a second image; and
a processor configured to perform, for a pixel location p in a reference image and a disparity d, the steps of:
i) determining, for the disparity d, a corresponding pixel location q in a second image corresponding to a pixel location p in a reference image;
ii) determining filter coefficients for filtering a candidate patch of the second image, for the disparity d, of said second image that includes said determined corresponding pixel location q;
iii) filtering a single one of the candidate patch of the second image and a reference patch of the reference image, for the disparity d, using a filter implemented using the determined filter coefficients, to generate a filtered candidate patch for the disparity d, said single one of the candidate patch of the second image and the reference patch of the reference image which is filtered using said filter being the candidate patch of the second image, said filtering including:
blurring the candidate patch when the reference patch of the reference image is blurrier than the candidate patch, and
sharpening the candidate patch when the reference patch of the reference image is sharper than the candidate patch;
iv) computing a matching cost value based on how well the filtered candidate patch for the disparity d matches the reference patch;
v) storing in memory the generated matching cost value for pixel location p and disparity d;
repeating steps i), ii), iii), iv) and v) for at least one other disparity d; and
determining a depth for pixel p based on the computed matching cost values corresponding to pixel p.

14. The system of claim 13, wherein said processor is further configured to perform a vehicle control operation based on the determined depth.

15. The system of claim 13, wherein determining filter coefficients for filtering the candidate patch, for the disparity d, of said second image that includes said determined corresponding pixel location depends on the content of both the reference patch as well as the corresponding candidate patch.

16. The system of claim 15, wherein the amount of sharpening or blurring performed by said filtering is a function of a difference between the candidate patch and corresponding reference patch.

17. The system of claim 16, wherein said difference between the candidate patch and the corresponding reference patch is an amount of difference in blur.

18. The system of claim 17, wherein the processor is further configured to:
generate a depth map from pixel depths determined for multiple pixels in the reference image.

19. The system of claim 13, wherein the processor is further configured to:
take a physical action based on the determined depth of an object corresponding to pixel p; and
wherein the depth of the object corresponding to pixel p is a distance from the reference camera to a surface of the object.

20. A non-transitory computer readable medium including processor executable instructions which, when executed by a processor, control the processor to perform the steps of:
i) determining, for the disparity d, a corresponding pixel location q in a second image corresponding to a pixel location p in a reference image;
ii) determining filter coefficients for filtering a candidate patch, for the disparity d, of said second image that includes said determined corresponding pixel location q;
iii) filtering a single one of: the candidate patch of the second image and a reference patch of the reference image, for the disparity d, using a filter implemented using the determined filter coefficients, to generate a filtered candidate patch for the disparity d, said single one of the candidate patch of the second image and the reference patch of the reference image which is filtered using said filter being the candidate patch of the second image, said filtering including:
blurring the candidate patch when the reference patch of the reference image is blurrier than the candidate patch and
sharpening the candidate patch when the reference patch of the reference image is sharper than the candidate patch;
iv) computing a matching cost value based on how well the filtered candidate patch for the disparity d matches the reference patch;
v) storing in memory the generated matching cost value for pixel location p and disparity d;
repeating steps i), ii), iii), iv) and v) for at least one other disparity d; and
determining a depth for pixel p based on the computed matching cost values corresponding to pixel p.

* * * * *